United States Patent

[11] 3,572,483

[72] Inventors Benoit Giguere
Lambton Village, Frontenac, Quebec;
Augustin Veilleux, 86 Normand Boulevard,
Chateauguay Centre, Quebec, Canada
[21] Appl. No. 809,733
[22] Filed Mar. 24, 1969
[45] Patented Mar. 30, 1971

[54] STEERING CLUTCH AND BRAKE FOR DOUBLE-TRACKED VEHICLE
3 Claims, 10 Drawing Figs.

[52] U.S. Cl. .................................................. 192/13,
192/48.91, 192/49, 192/89, 180/6.7
[51] Int. Cl. .......................................................F16d 67/02,
F16d 21/06, B62d 11/08
[50] Field of Search........................................... 192/13,
48.9; 192/48.91, 49, 89; 180/6.7

[56] References Cited
UNITED STATES PATENTS
526,981 10/1894 Prawatke...................... 192/48.9
1,825,220 9/1931 Char............................. 192/49(X)

1,880,344 10/1932 Franco ......................... 192/49
2,749,774 6/1956 Gates ........................... 192/48.9(X)
3,398,819 8/1968 Ruhl et al. .................... 192/13
FOREIGN PATENTS
725,686 3/1955 Great Britain................ 180/6.7
1,097,948 1/1968 Great Britain................ 180/6.7

Primary Examiner—Allan D. Herrmann
Attorney—Pierre Lespernace

ABSTRACT: A steering clutch and brake for double-tracked vehicles in which the vehicle engine drives the respective tracks through an intermediate driving shaft, carrying two clutching systems, each associated with one track of the vehicle and each including a driven clutch disc having a peripheral flange providing an external braking surface cooperable with a brakeshoe forming a braking system for stopping the vehicle or for making a sharper turn.

The drive also includes means for easily adjusting the clutching engagement of the clutching discs to prevent slipping.

Patented March 30, 1971
3,572,483
3 Sheets-Sheet 1
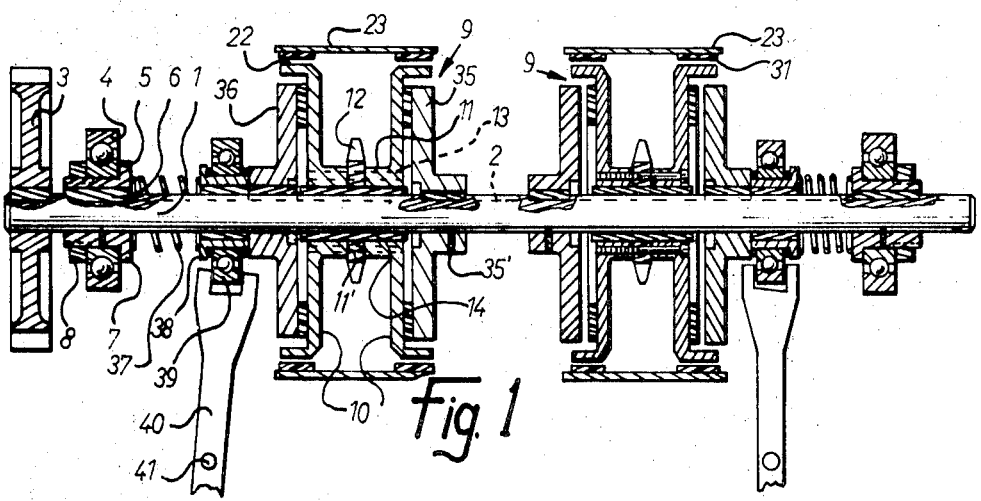
Fig. 1
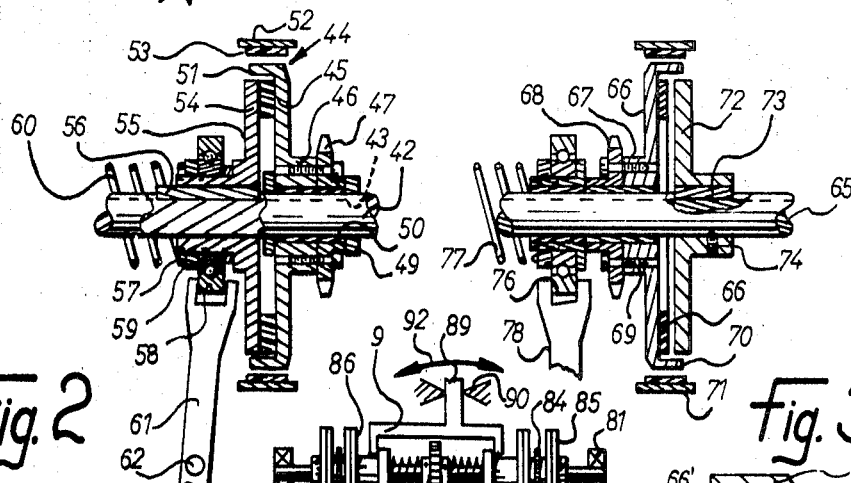
Fig. 2      Fig. 3
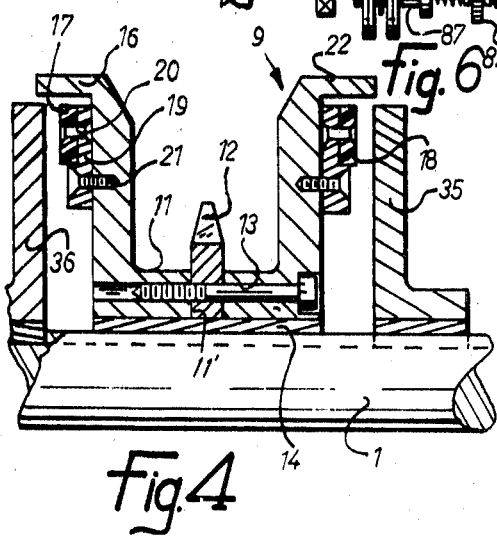
Fig. 4
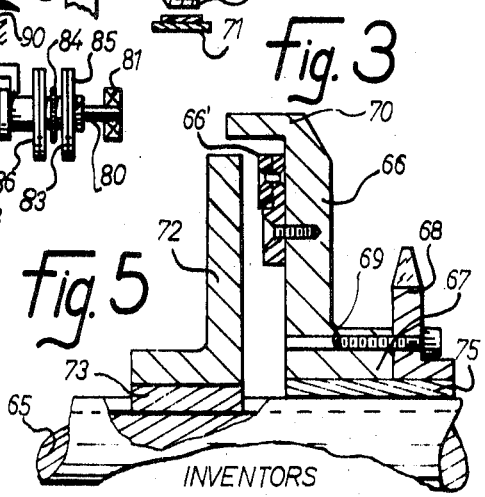
Fig. 5
Fig. 6
INVENTORS
Benoit GIGUERE
Augustin VEILLEUX
BY Pierre Lespérance
AGENT Patented March 30, 1971

INVENTORS
Benoit GIGUERE
Augustin VEILLEUX
BY Pierre Lespérance
AGENT

INVENTORS
Benoit GIGUERE
Augustin VEILLEUX
BY Pierre Lespérance
AGENT

STEERING CLUTCH AND BRAKE FOR DOUBLE-TRACKED VEHICLE

The present invention relates to a steering clutch and brake system for double-tracked vehicles and has for its main object such a system in which the clutching and braking elements are combined for simpler and less bulky construction.

Another object of the invention is to provide a drive for a double-tracked vehicle, in which the speed demultiplication ratio between the engine and the tracks can be easily changed to suit particular applications.

Another object of the invention resides in the provision of a drive for a double-tracked vehicle, in which a disc-type clutching system is associated with each track and is mounted on a common driving shaft, separate from the shafts directly driving the tracks, each clutching system including a driven clutching disc having a radial clutching surface and a sprocket member adapted to drive one track, said sprocket member being detachably secured to the driven disc so as to easily replace the sprocket by another of a different diameter to vary the demultiplication ratio between the driven disc and the related track.

Another object of the present invention resides in the provision of a drive of the character described, in which the sprockets are of smaller diameter than their associated discs to be protected by the latter and also to allow use of the clutching disc as part of the braking system.

Yet another object of the present invention resides in the provision of a drive of the character described, provided with means whereby declutching of one clutch system automatically increases the clutching engagement of the other system to prevent slippage between the clutching members of said last-named system, despite increased load thereon.

Another object of the invention is to provide means to adjust the clutching forces exerted on the two clutch systems.

The foregoing and other objects of the present invention will become more apparent during the following disclosure and by referring to the drawings, in which:

FIG. 1 is a longitudinal section of the drive system in accordance with a first embodiment of the invention;

FIG. 2 is a partial longitudinal section of a second embodiment;

FIG. 3 is a longitudinal section of a portion of a third embodiment;

FIG. 4 is a partial longitudinal section, on an enlarged scale, of the embodiment of FIG. 1;

FIG. 5 is a partial longitudinal section, on an enlarged scale of the right-hand portion of the system in accordance with the embodiment of FIG. 3;

FIG. 6 is a schematic elevation of a fourth embodiment;

In the drawings, like reference characters indicate like elements throughout.

Figure 7:
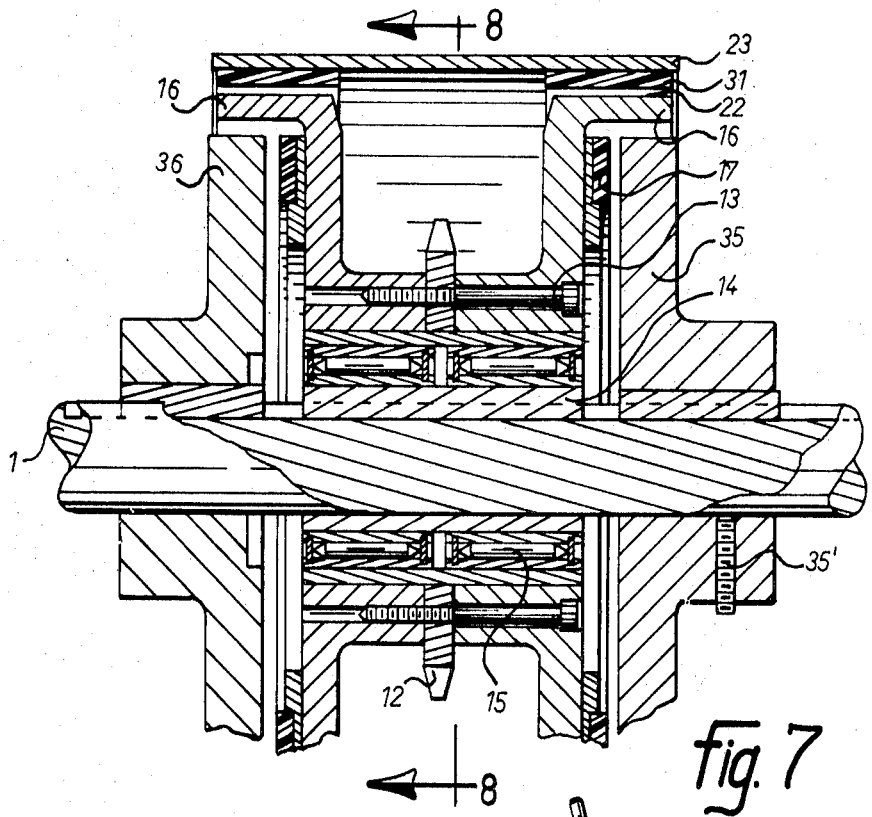
FIG. 7 is a partial longitudinal section, on an enlarged scale, of the embodiment of FIG. 1, said section taken on line 7—7 of FIG. 8.

FIG. 1 shows a driving shaft 1 having a keyway 2 throughout its length. A gearwheel 3 is keyed to the shaft 1 at one end of the latter. Shaft 1 is mounted transversely of a two-track motor vehicle, not shown, by means of ball bearings 4 disposed near both ends of the shaft, the inner race of the ball bearings surrounding a sleevelike bearing support 5 keyed to shaft 1 by key 6 and secured to the shaft by a setscrew. Support 5 has a flange 7 and is fitted with a ring 8 for locating the ball bearing.

Two clutching and braking systems 9 are mounted on the shaft 1, each adapted to be associated with one track of a two-track vehicle. Each clutching and braking system 9 comprises a pair of opposed driven clutching discs 10, each having a hub 11 secured to each other and to an intermediate annular sprocket 12 by means of bolts 13 extending axially through the joined hubs and sprocket. Sprocket 12 is secured flat against radial end face 11' of the respective hubs 11 and its teeth are axially spaced from the respective discs 10.

The sprocket 12 surrounds, together with the hubs 11, a bushing 14 mounted on driving shaft 1 for free longitudinal and rotational movement of the assembly of the two driven clutching discs and sprocket.

As shown in FIG. 7, it is preferable to dispose a needle bearing 15 between bushing 14 and the hubs 11 and sprocket 12 to reduce friction in the rotation of the assembly of the driven clutching disc and sprocket on shaft 1. Bushing 14 is preferably keyed to shaft 1 but can move longitudinally of the latter.

Each clutching disc 10 has a peripheral cylindrical flange 16 directed opposite to hub 11. A friction lining 17, of flat annular shape, with a radial outer face 18 (FIG. 4), is secured to a ring 19 by means of rivets 20. Said ring 19 is secured flat against the radial outer face of the respective clutching discs 10 by means of bolts 21, so that the assembly of the ring 19 and friction lining 17 may be easily replaced when lining 17 is worn out.

The two flanges 16 provide an external frictional cylindrical surface 22 which form part of a braking system, including a curved brakeshoe 23, surrounding about half the periphery of the driven clutching discs 10, pivoted at 24 to the vehicle frame (See FIG. 8) and having its outer end attached by a spring 25 to a pull rope 26 trained on a pulley 27 and attached to the end of an operating crank lever 28 pivoted at 29 to the vehicle frame.

Pivotal movement of lever 28 (FIG. 8) in the direction of arrow 30 will cause application of the brakeshoe 23 and, more particularly, of the friction lining 31 (FIG. 7) of the same onto the surface 22 of the two clutching discs. Upon release of lever 28, a return spring 32, attached to the outer end of the brakeshoe 23 and to the vehicle frame, disengages the brakeshoe 23 from surface 22.

Figure 10:
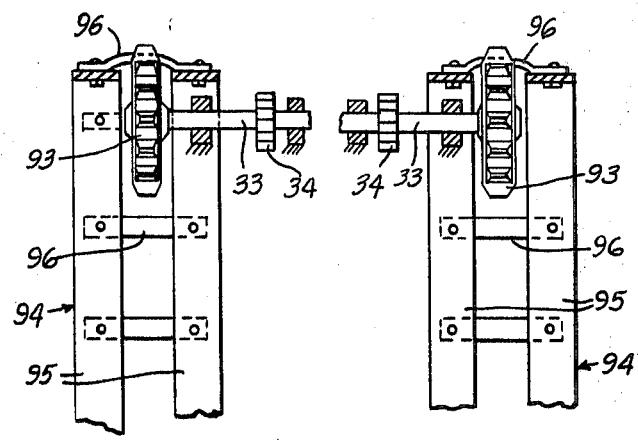
FIG. 10 is a schematic plan section of the two tracks of the vehicle and their respective drive.

Each sprocket 12 is adapted to drive a shaft 33 (see FIGS. 8 and 10), on which a track engaging sprocket (93) is directly keyed. As shown in FIG. 10, each track 94 may consist of two rubber belts 95 interconnected by spaced cross links 96. Thus, each of the two shafts 33 is adapted to directly drive an associated track of the vehicle. Therefore, driving shaft 1 is an intermediate shaft between the engine and the shafts 33 and the operative connection is made between the shafts 1 and 33 through a chain 34' trained on the respective sprockets 12 and sprockets 34 keyed to shaft 33.

Driving clutching discs 35 and 36 are mounted on each side of the assembly of the two driven clutching discs 10 and sprocket 12. Driving clutching disc 35 is keyed to, and rigidly secured, by setscrew 35' (FIG. 1) against longitudinal movement on the shaft 1, while clutch disc 36 is keyed to the shaft 1 but can be longitudinally displaced thereon.

The two discs 35, 36 have a smaller diameter than cylindrical flanges 16 and are covered thereby and are adapted to engage the friction linings 17 of the driven clutching discs 10 upon axial displacement of disc 36 towards the assembly of the two discs 10 and consequent axial displacement of the latter towards fixed driving disc 35.

This axial displacement is achieved by a compression coil spring 37 (FIG. 1) abutting at one end against the flange 7 of the sleeve 5 and at the other end against a flanged sleeve 38, in turn abutting against the hub of the clutching disc 36. Thus, the clutching system is normally maintained in clutching engagement under the action of the respective coil springs 37, while the braking system is normally maintained in inoperative position under the action of the return spring 32.

To release each clutch, a ball bearing surrounds the flanged sleeve 38 having its inner race tightly fitted on the same, and its outer race engaged by a fork member 40, which is pivoted to the vehicle frame at 41. Thus, alternate operation of the fork member 40 will release the associated clutch assembly to enable steering of the two-track vehicle. Moreover, braking of the unclutched driven discs 10 will completely stop the associated track to make a sharper turn. Release of the two clutching systems and simultaneous braking of the same will brake the vehicle.

The outer ends of the two operating fork levers 40 may be provided with a cam follower engaging a cam operated by a steering wheel and arranged so as to have a position in which the two clutches are in clutching engagement, two positions in which one or the other clutch is released, and a fourth position in which both clutches are released. The two braking systems may be operated in the same manner by a single cam control.

From the foregoing, it is seen that each clutching disc is provided with a radial clutching surface, whereby the clutching and declutching operations are effected by axial relative movement of the discs to provide for better clutching efficiency. Moreover, the sprocket 12 may be easily removed and replaced by a sprocket of a different diameter to easily change the speed ratio between the intermediate shaft 1 and the shafts 33 directly driving the tracks of the vehicle. The sprockets 12 and the sprocket chain 34' (FIG. 8) are protected by the larger diameters of the driven clutching discs 10.

It will be noted that each clutching system provides a relatively large friction surface for clutching purposes due to the provision of two driven and two driving clutching discs.

It should also be noted that, because the driving shaft 1 has a keyway 2 throughout its length, the different elements mounted thereon can be interchanged to suit particular applications without modifying said elements; for instance, gear 3 may be positioned at the center of the shaft between the two clutching assemblies and, similarly, the compression coil springs 37 together with the actuating fork members 40, may be disposed between the two clutches.

FIG. 2 shows another arrangement in which each clutching system comprises a single driven and a single driving clutching disc. In FIG. 2 only one such clutching system is shown. As in the first embodiment, a driving shaft 42 has a keyway 43 throughout its length and is mounted in ball bearings not shown and is provided with a driving gear, not shown.

Each clutching and braking system 44 comprises a driven clutching disc 45, having a hub 46, to which is removably secured an annular sprocket 47 by means of axially extending bolts 48. Disc 45 and its sprocket 47 are mounted for free rotation on the shaft 42 but are prevented from longitudinal displacement thereon by means of collars 49 tightly surrounding the shaft 42 on each side of the disc 45.

Hub 46 is mounted on a bushing 50 surrounding the shaft 42. Said bushing is preferably associated with a needle bearing arrangement as in FIG. 7.

Disc 45 has a cylindrical peripheral flange 51 providing an outer cylindrical braking surface adapted to cooperate with a brakeshoe 52 having an inner friction lining 53.

Figure 8:
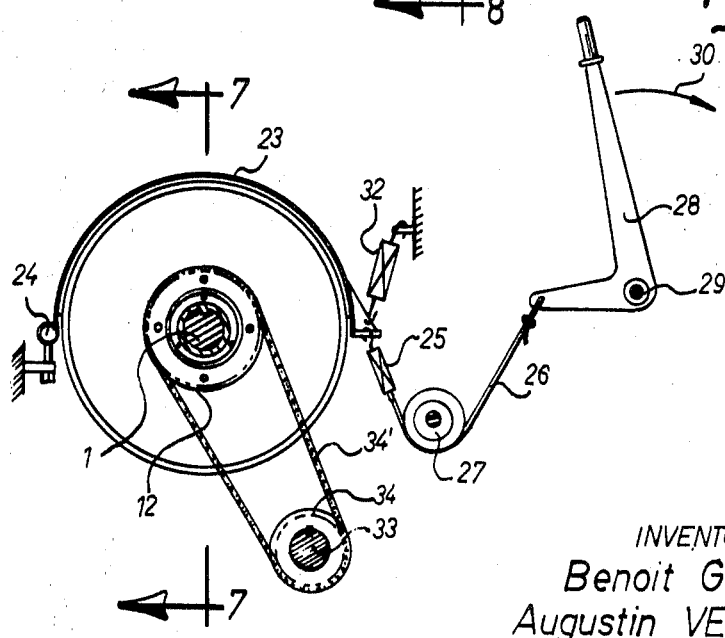
FIG. 8 is a cross section taken on line 8–8 of FIG. 7 and showing also the operating means for the braking system.

Brakeshoe 52 may be operated in the same manner as in the first embodiment, namely by a system such as shown in FIG. 8 and including pull rope 26, operating lever 28 and the associated springs 25 and 32.

Disc 45 carries a clutching friction lining 54 providing a radial surface and which may be of the removable type as the one shown in FIG. 4. This friction lining faces a driving clutching disc 55 providing a radial surface for engagement therewith.

Disc 55 is mounted on shaft 42 and is keyed thereon by means of a key 56. Thus, disc 55 may move longitudinally of shaft 42 but is prevented from rotating with respect to the same. Disc 55 has a hub 57 on which a ball bearing 58 is mounted and axially retained thereon by ring 59.

A coil spring 60 surrounds shaft 42 and abuts against an abutment (not shown) on the shaft 42 at one end, such as ball bearing support 5 of the first embodiment, while its other end pushes on ring 59 and, consequently, urges the driving clutching disc 55 into clutching engagement with the driven disc 45. An actuating declutching fork lever 61 is pivoted at 62 to the chassis frame and engages the outer race of ball bearing 58 to release the clutch, as in the first embodiment.

FIGS. 3 and 5 show a third embodiment in which it is the driven disc which is acted upon by the compression spring instead of the driving clutching disc as in FIG. 1 or 2. In this arrangement, wherein FIG. 3 shows a left-hand clutching assembly and FIG. 5 the right-hand clutching assembly, the intermediate driving shaft 65 has a keyway throughout its length and the driven clutching disc 66 is mounted for free rotation and free longitudinal movement on shaft 65.

Disc 66 has a hub 67 to which is removably secured an annular flanged sprocket 68 by means of bolts 69. Disc 66 has a peripheral cylindrical flange 70 adapted to cooperate with the braking shoe 71 and a clutching friction lining 66' providing a radial clutching surface, cooperable with the radial surface of driving clutching disc 72. The latter is keyed on shaft 65 by key 73 and secured against longitudinal displacement by setscrew 74.

Driven disc 66 and flanged sprocket 66 are mounted on a bushing 75 surrounding the shaft 65. A ball bearing assembly 76 has its inner race longitudinally displaceable on the shaft 65 and abuts against the assembly of the driven disc and sprocket under the action of a compression coil spring 77 so as to urge the two clutching discs into engagement.

A fork lever 78 engaging the outer race of ball bearing 76 serves to release the clutch.

FIG. 6 shows a modification of this system in which the two independent fork levers of the other embodiment are combined in a common fork member to alternately actuate the two clutching systems.

In this arrangement the intermediate driving shaft 80 is supported on the vehicle frame or chassis by ball bearings 81 and carries at its center a driving gear 82 keyed thereto.

The two clutching systems, each associated with one track of the vehicle, are mounted on both sides of the central gear 82 and each comprises, as in the first embodiment, a pair of driven clutching discs 83 with associated sprocket 84 and arranged between driving clutching discs 85, 86. The driving discs 85, 86 are disposed inwardly of the system and provided with a flanged hub 87.

Compression coil springs 88 surround the shaft 80, abut at one end against the central gear 82 and at the other end against the hubs 87 to normally urge the discs 85, 86 into clutching engagement.

A common fork member 89 is pivoted at 90 on the chassis frame for pivotal movement in a plane containing shaft 80 and has branches 91 engaging the inside of the flange of the respective hubs 87, so as to alternately declutch the two clutching systems by pivotal movement of the fork member 89 in the direction of double arrow 92.

In all the embodiments, it is obvious that the sprocket attached to the driven clutching disc or discs, such as sprockets 12, 47, 68, and 84, may be replaced by another annular motion transmitting member, such as a pulley for engaging a transmission belt, for instance in the case where the vehicle is of small size.

Figure 9:
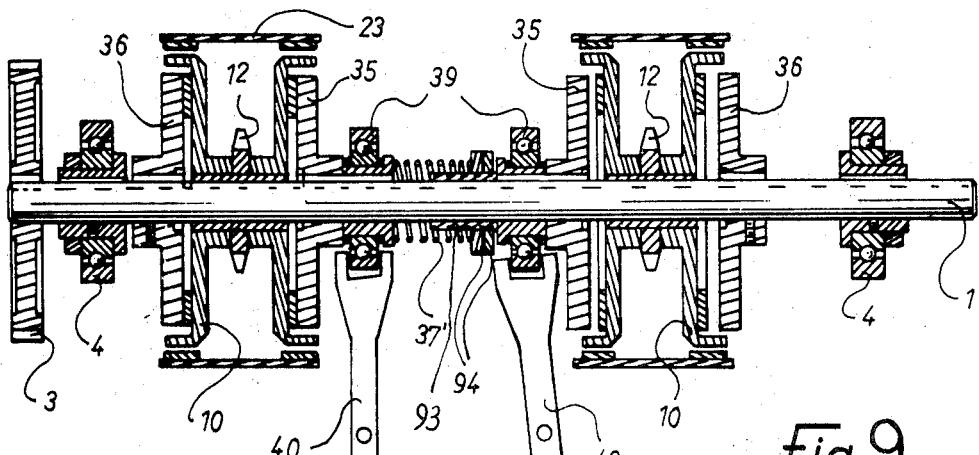
FIG. 9 is a longitudinal section of a fifth embodiment of the invention.

FIG. 9 shows an embodiment similar to that of FIG. 1, except that it incorporates means to automatically increase the clutching engagement of the discs of the clutched system upon declutching of the other systems.

As in the first embodiment, driving shaft 1 has a keyway throughout its length. A gearwheel 3 is keyed to the shaft at one end of the latter and serves to drive shaft 1. Shaft 1 is mounted transversely of a two-track motor vehicle by means of ball bearings 4. Two clutch and brake systems are mounted on shaft 1, each adapted to be associated with one track of a two-track vehicle. Each clutch and brake system comprises a pair of opposed driven clutch discs 10 detachably secured to an intermediate annular sprocket 12 by means of bolts, not shown, and this driven unit is freely and rotatably and axially movable on shaft 1.

The outer cylindrical flanges of disc 10 form a braking surface for braking engagement with a curved brakeshoe 23. Driving clutch discs 35 and 36 are mounted on each side of the assembly of driven clutch discs 10 and sprocket 12. Driving clutch disc 35 is keyed to, but is longitudinally displaceable on shaft 1, while driving clutch disc 36 is keyed to and firmly secured by a setscrew on shaft 1.

A ball bearing assembly 39 is mounted on shaft 1 between the two clutch discs 35 and each abuts one disc 35. The ball bearings are axially movable on shaft 1 and can be displaced against the action of a compression coil spring 37' by the alternate operation of a fork member 40 pivoted to the vehicle chassis.

In accordance with the feature of FIG. 9, the compression coil spring 37' is compressed between the two ball bearing assemblies 39 and urge the same outwardly of each other, whereby operation of one lever 40 to displace one ball bearing 39 towards the other ball bearing 39 and thereby to release one clutch system automatically compresses the spring 37', which in turn exerts an increased axial force on the clutched assembly to prevent slippage between the driving and the driven discs of the clutched assembly.

It should be noted that, when one clutch system is declutched, the engine driving torque is applied entirely on the single remaining clutched system and there is an increased load on this system. Therefore, the increased clutching force exerted on the driving and driven discs of the clutched system will prevent slippage between said discs.

In accordance with another feature of the embodiment of FIG. 9, one end of coil spring 37' surrounds an externally threaded sleeve 93 and abuts a nut 94 screwed on sleeve 93. The latter is axially displaceable on shaft 1. One end of sleeve 93 abuts a ball bearing assembly 39 and the nut 94 can be adjustably positioned and locked on sleeve 93 by another nut 94, so as to effectively adjust the clutching force of the coil spring 37' exerted on the two clutch systems.

We claim:

1. A steering clutch and brake for a double-track vehicle, comprising a driving shaft, two assemblies of mutually engageable driving and driven clutching discs mounted on said shaft, the discs of each assembly having mutually facing radial clutching surfaces adapted to come into clutching engagement by relative axial movement of said discs on said shaft, spring means acting on said discs to normally maintain the same in clutching engagement, control means to effect cancelling of the action of said spring means on the discs of a selected assembly to obtain declutching of the driven disc of said assembly and an annular motion transmitting member for each assembly surrounding said driving shaft and secured to the driven clutching disc, each motion transmitting member adapted to be operatively connected to a related track of a double track vehicle, said driven clutching disc having a peripheral flange providing an external cylindrical braking surface, and further including a brakeshoe cooperable with said braking surface and partially surrounding said flange, the latter overlying the associated driving disc.

2. A steering clutch and brake for double-track vehicle, comprising a driving shaft, two assemblies of mutually engageable driving and driven clutching discs mounted on said shaft, the discs of each assembly having mutually facing radial clutching surfaces adapted to come into clutching engagement by relative axial movement of said discs on said shaft, spring means acting on said discs to normally maintain the same in clutching engagement, control means to effect cancelling of the action of said spring means on the discs of a selected assembly to obtain declutching of the driven disc of said assembly and an annular motion transmitting member for each assembly surrounding said driving shaft and secured to the driven clutching disc, each motion transmitting member adapted to be operatively connected to a related track of a double track vehicle, said spring means including at least one compression coil spring surrounding and axially displaceable on said shaft intermediate said assemblies and exerting opposite axial forces on the discs of the two assemblies to normally maintain said discs in clutching engagement, said control means including members for selectively axially moving each end of said spring away from the discs of one assembly to obtain declutching of the driven discs of said last-named assembly and to simultaneously increase the force exerted by said spring on the discs of the other assembly to increase the clutching engagement of said discs of last-named assembly, and means to adjust the pressure exerted by aid coil spring on the discs of the two assemblies.

3. A steering clutch and brake as claimed in claim 2, wherein said last-named means include a sleeve axially movable on said shaft and having external threads, a nut adjustably longitudinally screwed on said sleeve, one end of said coil spring abutting said nut, one end of said sleeve away from said spring acting as a pusher member to act on the discs of one of said assemblies.